United States Patent [19]

Clark et al.

[11] Patent Number: 4,708,429

[45] Date of Patent: Nov. 24, 1987

[54] OPTICAL FIBER ASSEMBLY AND OPTICALLY COUPLED DEVICE PACKAGE INCLUDING SAME

[75] Inventors: David W. Clark, Lititz; Morton Freedman, Lancaster, both of Pa.

[73] Assignee: RCA Corporation, Del.

[21] Appl. No.: 780,311

[22] Filed: Sep. 26, 1985

[51] Int. Cl.[4] .................................................. G02B 7/26
[52] U.S. Cl. ...................................................... 350/96.20
[58] Field of Search ............... 350/96.15, 96.20, 96.23, 350/96.29; 357/17, 19, 74, 80

[56] References Cited

U.S. PATENT DOCUMENTS

| | | | |
|---|---|---|---|
| 4,119,363 | 10/1978 | Camlibel et al. | 350/96.20 |
| 4,233,619 | 11/1980 | Webb et al. | 357/74 |
| 4,385,797 | 5/1983 | Dubois et al. | 350/96.2 |
| 4,456,334 | 6/1984 | Henry et al. | 350/320 |
| 4,615,031 | 9/1986 | Eales et al. | 350/96.2 X |

Primary Examiner—Eugene R. LaRoche
Assistant Examiner—Steven J. Mottola
Attorney, Agent, or Firm—Fred Jacob

[57] ABSTRACT

An optically-coupled device package including a housing containing an optical device further includes an optical fiber assembly which comprises an optical cable with a support sleeve on its end. The support sleeve comprises a body with an axial opening therethrough and has a plurality of holes near a first end. The optical cable includes a first portion comprising a protective coating overlying an optical fiber, and a second portion comprising an optical fiber extending from said coating. The cable enters the first end of the sleeve and nodules integral with the protective coating extend into the plurality of holes. In one embodiment, the optical fiber is sealed to the inside of the sleeve through a solder window provided through the side of the sleeve. The second end of the sleeve extends through an aperture in said housing and is aligned to the device therein. The invention also includes a method for making such a fiber assembly which comprises inserting the optical cable into a first end of the sleeve, forming nodules integral with the protective coating which extend into the plurality of holes. The method may comprise sealing the optical fiber to the inside of the sleeve through a solder window in said sleeve. Fabrication of an optically-coupled device package further comprises inserting the fiber assembly through an aperture in said housing and aligning said fiber with the optical device therein.

30 Claims, 5 Drawing Figures

OPTICAL FIBER ASSEMBLY AND OPTICALLY COUPLED DEVICE PACKAGE INCLUDING SAME

This invention pertains to an optically-coupled device package, and more particularly concerns such a package including an optical fiber assembly having enhanced physical strength and a method for the manufacture of such a package.

BACKGROUND OF THE INVENTION

In the field of optical communications an optical device such as a laser, LED or photodiode can be hermetically sealed in a housing to protect the device from deleterious effects of the ambient. Since optical signals to and from such a device are transmitted through an optical fiber, the point of entry of the fiber into the housing should also be hermetically sealed. In addition, the fiber-to-housing union should have good physical stability.

In the assembly of such a package the sealing, whether hermetic or otherwise, and physical anchoring of the fiber should be carried out with minimal stress and shock to the fragile, small diameter optical fiber. An improved optical fiber assembly, an optically-coupled device package, and a method for their assembly have been sought.

SUMMARY OF THE INVENTION

An optically-coupled device package including a housing containing an optical device further includes an optical fiber assembly which comprises an optical cable with a support sleeve on its end. The support sleeve comprises a body with an axial opening therethrough and has a plurality of holes near a first end. The optical cable includes a first portion comprising a protective coating overlying an optical fiber, and a second portion comprising an optical fiber extending from said coating. The cable enters the first end of the sleeve and nodules integral with the protective coating extend into the plurality of holes. In one embodiment, the optical fiber is sealed to the inside of the sleeve through a solder window provided through the side of the sleeve. The second end of the sleeve extends through an aperture in said housing and is aligned to the device therein.

The invention also includes a method for making such a fiber assembly which comprises inserting the optical cable into a first end of the sleeve, forming nodules integral with the protective coating which extend into the plurality of holes. The method may comprise sealing the optical fiber to the inside of the sleeve through a solder window in said sleeve. Fabrication of an optically-coupled device package further comprises inserting the fiber assembly through an aperture in said housing and aligning said fiber with the optical device therein.

DETAILED DESCRIPTION OF THE PREFERRED EMBODIMENTS

Figure 1:
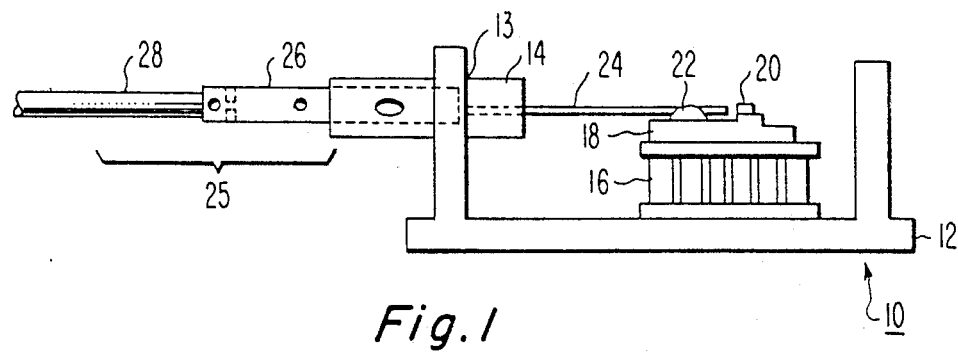
FIG. 1 is a cross-sectional view of an optically-coupled device package of the invention.

In FIG. 1 an optically coupled device package 10 comprises a housing 12 with an aperture 13 extending through one of its walls. Optionally, a neck 14 can extend through the aperture 13. Mounted within the housing 12 is an optional thermoelectric cooler 16 which controls the temperature of the base plate 18 and an optical device 20 mounted thereon. The optical device 20 can be a laser, LED, or detector. A bonding material 22 such as solder or epoxy holds an optical fiber 24 onto the base plate 18 in alignment with the device 20. An optical fiber assembly 25 comprising a support sleeve 26 and an optical cable 28 is sealed within the aperture 13 or neck 14. A lid, not shown, is ultimately sealed to the top of the housing 12. The housing 12, neck 14 and lid can be of a metal such as copper or brass, and are typically metallized, e.g. with nickel and gold. For a hermetic package, the seals between the fiber 24 and sleeve 26, the sleeve 26 and aperture 13 or neck 14, the neck 14 and the aperture 13, and the lid and the housing 12, should be hermetically tight. The present invention will be more clearly understood by describing the fabrication of the package 10 of FIG. 1, concentrating on the optical fiber assembly 25.

Figure 2:
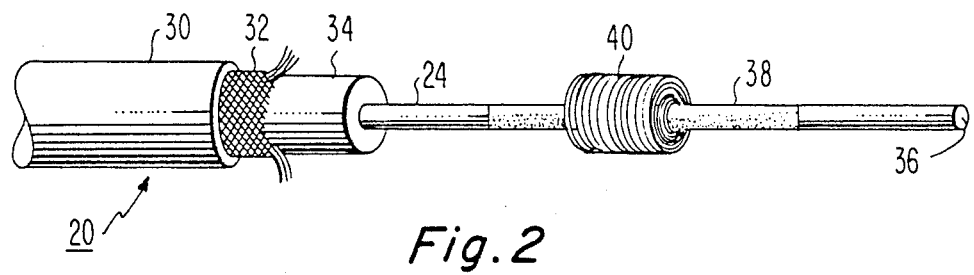
FIG. 2 is a perspective view of an optical cable prepared for assembly in accordance with the invention.

In FIG. 2 the cable 28 includes an outer jacket 30 around a fibrous support layer 32, e.g. of Kevlar ®, a registered trademark of the DuPont Company. Inside the fibrous layer 32 is a protective coating 34 which overlies the optical fiber 24. The protective coating 34 is typically a resilient synthetic material, e.g. polypropylene, nylon, teflon or the like. This protective coating 34 should be stripped away to expose a length of the optical fiber 24 sufficient for coupling. A surface area 38 of the optical fiber 24 is metallized to enhance the subsequent wetting of solder thereto in applications requiring soldering of the fiber 24 within the assembly 25. Several prior art methods utilizing solder preforms result in small voids where the solder does not wet properly to the fiber 24. A suitable metallization is between about 50 and 100 nanometers (nm) of chromium followed by between about 50 and 100 nm of gold. Overlying the metallized area 38 is a solder preform 40 which may be a tight wire wrap or a cylindrical preform of the desired solder material. Gold or a gold-tin alloy is suitable for the preform 40 since tin-lead solders tend to scavenge all of the evaporated gold from the metallized area 38 causing improper wetting. The preform 40 is heated sufficiently so that the preform 40 wets the metallized area 38 of the fiber 24. The outside diameter of the wetted preform 40 should be about equal to that of the protective coating 34.

Figure 3:
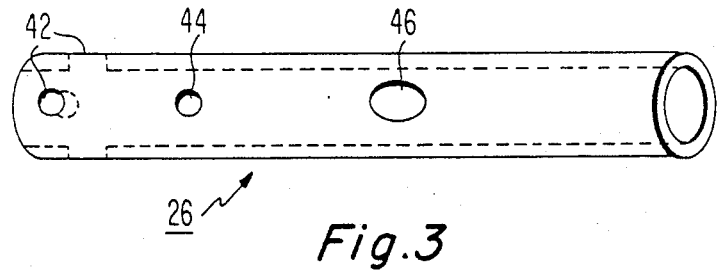
FIG. 3 is a perspective view of the support sleeve of FIG. 1.

FIG. 3 shows the support sleeve 26 of FIG. 1, which comprises a body with an axial opening therethrough. Anchor holes 42, extending to the opening, are provided through the walls of the support sleeve 26 near a first end. A test port 44 is provided through the side of the sleeve 26 and is located between the anchor holes 42 and a solder window 46. The outside diameter of the support sleeve 26 is about equal to the inside diameter of the neck 14 of FIG. 1. The inside diameter of the sleeve 26 is about equal to the diameter of the protective coating 34 of the optical cable 28 of FIG. 2. The support sleeve 26 can be of a metal, such as copper or brass, and typically is metallized with, for example, nickel and gold.

Figure 4:
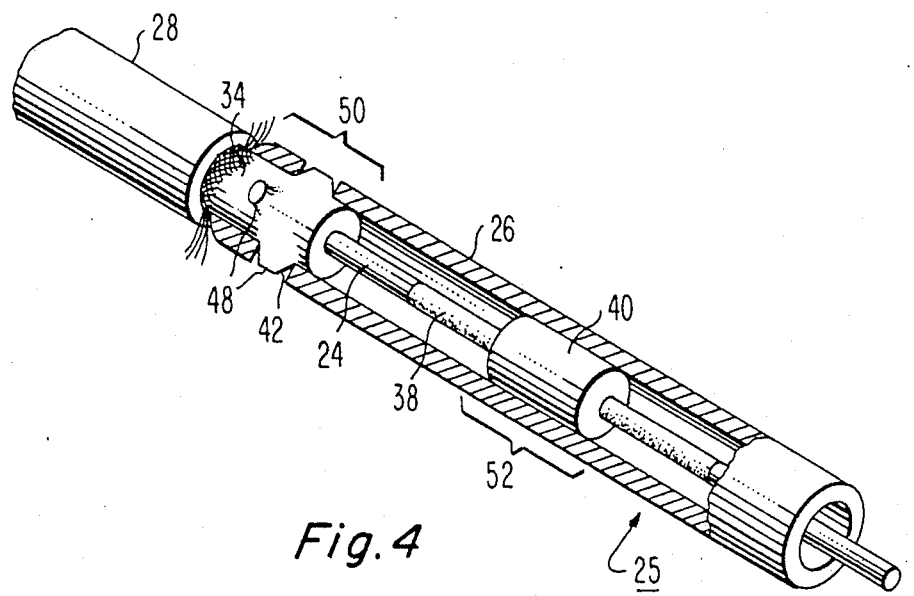
FIG. 4 is a perspective view partially cutaway of an optical fiber assembly of the invention.

FIG. 4 illustrates an optical fiber assembly 25 comprising an optical cable 28 which has been inserted in one end of, and axially through, said support sleeve 26. The cable 28 is positioned such that the protective coating 34 is adjacent the anchor holes 42. Nodules 48, integral with the protective coating 34, are formed in the anchor holes 42. This can be done by causing the protective coating 34 to flow into the anchor holes 42 forming the nodules 48, e.g. by heating. Alternatively, small portions of a material that can be fused with the protective coating 34 can be inserted into the holes 42 to form the nodules 48. The nodules 48 make up a physical anchor 50 in the area of the anchor holes 42 giving the optical cable 28 stability within the sleeve 26. Typically, the preform 40 is located adjacent the solder window 46 of FIG. 3. At this point the sleeve is heated while a solder, e.g. a lead-tin alloy, is introduced through the solder window 46 which solder wets to the preform 40 and the inside of the sleeve 26 to form the seal 52, which can be hermetic.

Since the glass fiber 24 is now physically anchored and sealed within the support sleeve 26 of the optical fiber assembly 25, breakage of the fiber 24 near the area of the protective coating 34 is eliminated. Also, as distinguished from prior art techniques in which a support member is threaded onto the protective coating 34, the present process involves no undue maneuvering of the optical fiber 24 within the support sleeve 26 prior to sealing and anchoring. The fiber 24 may be of any desired length within, or extending from, said sleeve 26.

Figure 5:
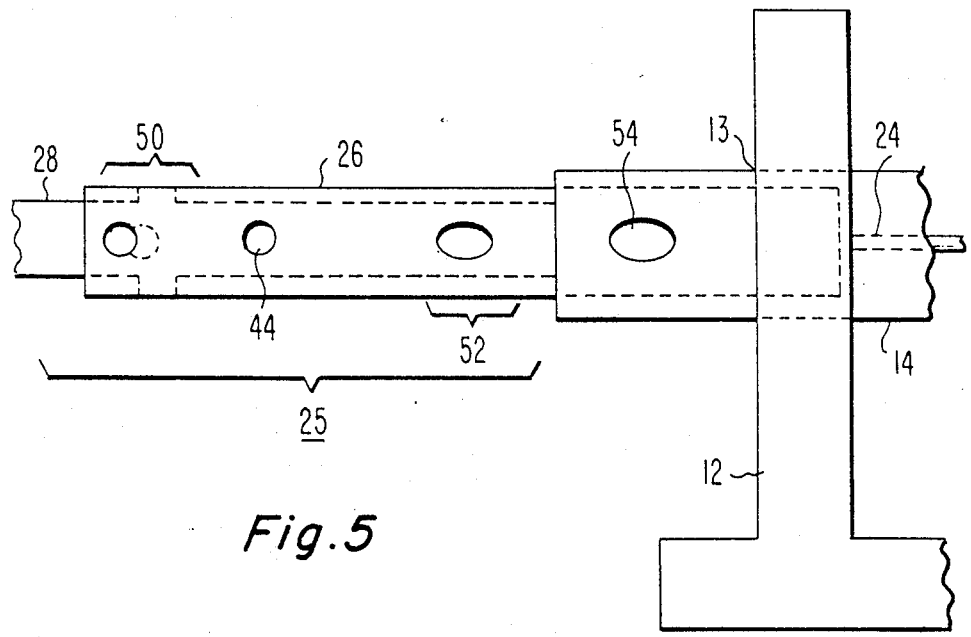
FIG. 5 is a perspective view of the fiber assembly of FIG. 4 in cooperation with the housing in accordance with the invention.

The fiber assembly 25 is inserted into the neck 14 as shown in FIG. 5. Specifically, a second end of the support sleeve 26 is positioned within the neck 14 such that the optical fiber 24 can be aligned with the optical device 20 of FIG. 1. The fiber 24 can be held in alignment by the bonding material 22 also shown in FIG. 1. The sleeve 26 may be fastened in this position within the neck 14 by any convenient means. For example, an aperture 54 may be provided in the side of the neck 14 through which a molten solder can be added. Also, while the sleeve 26 is shown extending partially through the neck 14 in FIG. 5, this sleeve 26 could easily be made longer so as to extend further into the housing 12 to give greater stability to the sleeve 26-to-neck 14 seal and to afford greater protection to the length of optical fiber 24.

If the package 10 is to be hermetically sealed prior to sealing the lid (not shown) onto the housing 12, the reliability of seal 52 can be verified by known techniques such as applying a vacuum to the top of the housing 12 and introducing a source of helium gas near to the joints to be tested. The optional test port 44 in FIG. 5 is provided for introduction of helium. Many hermetic seals according to the prior art actually contain large voids between the fiber and solder. These seals may appear leak tight if the protective coating forms a good seal. Subsequent movement of the optical cable however, easily breaks the seal made by the protective coating and packages thought to be acceptable actually allow the ambient to reach the device. In accordance with the present invention, the test port 44 of FIG. 5 is located between the physical anchor 50 and the seal 52 to insure that it is the seal 52 that is tested during a leak check. Therefore, as shown in FIG. 4, the protective coating 34 should be stripped back beyond the port 44.

The present invention provides an effective, reliable hermetic seal of an optical cable, including a fragile optical fiber, to an optical device package with minimal handling and damage to the fiber.

We claim:

1. An optical fiber assembly comprising:
   a support sleeve comprising a body with an opening extending axially therethrough and a plurality of anchor holes near a first end extending from said opening through the sides of said sleeve; and,
   an optical cable, inserted into said first end, including a first portion comprising a protective coating overlying an optical fiber and a second portion comprising a bare optical fiber extending from said coating, said protective coating extending within said support sleeve beneath the anchor holes, the protective coating including nodules formed integrally with said protective coating to extend into the anchor holes securing said cable to said support sleeve.

2. The assembly of claim 1 wherein said support sleeve further comprises an elongated, cylindrical body.

3. The assembly of claim 2 wherein the inside diameter of the opening is substantially equal to the diameter of the protective coating overlying said fiber.

4. The assembly of claim 1 wherein said support sleeve further comprises a solder window extending through a side of said sleeve into said axial opening which window corresponds in position to said bare optical fiber.

5. The assembly of claim 4 wherein said bare optical fiber is sealed to the inside of the sleeve in the area of the solder window.

6. The assembly of claim 5 wherein said seal is hermetic.

7. The assembly of claim 6 wherein said seal comprises layers of chromium and gold wetted to the bare optical fiber, a gold-tin alloy preform wetted to said gold layer, and a lead-tin alloy wetted between said preform and the inside wall of said sleeve.

8. The assembly of claim 4 wherein said support sleeve further comprises a test port through a side wall thereof, between said anchor holes and said solder window.

9. The assembly of claim 1 wherein said bare optical fiber extends beyond a second end of said support sleeve.

10. An optically coupled device package comprising a housing with an aperture through a wall thereof;
    an optical device mounted within said housing; and,
    an optical fiber assembly comprising:
    a support sleeve comprising a body with an opening extending axially therethrough an a plurality of anchor holes near a first end extending from said opening through the sides of said sleeve; and,
    an optical cable, inserted into said first end, including a first portion comprising a protective coating overlying an optical fiber and a second portion comprising a bare optical fiber extending from said coating, said protective coating extending within said support sleeve beneath the anchor holes, the protective coating including nodules formed integrally with said protective coating to extend into the anchor holes securing said cable to said support sleeve, and a second end of the sleeve extending through said aperture and said bare optical fiber is aligned with said device.

11. The package of claim 10 wherein said support sleeve further comprises an elongated, cylindrical body.

12. The package of claim 11 wherein the inside diameter of the opening is substantially equal to the diameter of the protective coating overlying said fiber.

13. The package of claim 10 wherein said support sleeve further comprises a solder window extending through a side of said sleeve into said axial opening which window corresponds in position to said bare optical fiber.

14. The package of claim 13 wherein said bare optical fiber is sealed to the inside of the sleeve in the area of the solder window.

15. The package of claim 14 wherein said seal is hermetic.

16. The package of claim 15 wherein said seal comprises layers of chromium and gold wetted to the bare optical fiber, a gold-tin alloy preform wetted to said gold layer, and a lead-tin alloy wetted between said preform and the inside wall of said sleeve.

17. The package of claim 13 wherein said support sleeve further comprises a test port through a side wall thereof, between said anchor holes an said solder window.

18. The package of claim 10 wherein said bare optical fiber extends beyond a second end of said support sleeve.

19. A method for fabricating an optically coupled device package, which package includes an optical device within a housing and having an optical cable connected to said housing, comprising the steps of:
(a) preparing an optical fiber assembly by:
  (1) providing a support sleeve comprising a body with an opening extending axially therethrough and a plurality of anchor holes near a first end, extending from said opening through the sides of said sleeve;
  (2) inserting an optical cable into said first end of said sleeve, which cable includes a first portion comprising a protective coating overlying an optical fiber and a second portion comprising a bare optical fiber extending from said coating, sand further wherein said protective coating is adjacent said anchor holes; and,
  (3) forming nodules integral with said protective coating which extend into said anchor holes to secure said cable to said support sleeve;
(b) inserting the fiber assembly through an aperture in said housing; and
(c) aligning said optical fiber with said optical device.

20. The method of claim 19 wherein said nodules are formed by causing a portion of the protective coating to flow and solidify in the anchor holes.

21. The method of claim 20 wherein the protective coating is caused to flow by heating.

22. The method of claim 19 wherein said nodules are formed by inserting a material into said anchor holes and fusing said material to said protective coating.

23. The method of claim 19 further comprising sealing the bare optical fiber to the inside of said sleeve.

24. The method of claim 23 wherein step (a)(1) further comprises providing a support sleeve with a solder window through a side thereof, extending to said axial opening.

25. The method of claim 24 wherein molten solder is introduced through said solder window and wetted to said bare optical fiber prior to step (b) to form a hermetic seal of the fiber to the sleeve.

26. The method of claim 25 wherein a solder preform is wetted to said bare optical fiber prior to inserting said fiber into said sleeve.

27. The method of claim 19 further including providing a support sleeve comprising an elongated cylindrical body wherein the inside diameter of said axial opening is substantially equal to the diameter of the protective coating.

28. The method of claim 19 further comprising fastening said fiber assembly within said aperture subsequent to step (c).

29. The method of claim 28 wherein said fastening is accomplished by soldering.

30. The method of claim 29 wherein said soldering forms a hermetic seal of said assembly to said housing.

* * * * *